Figure 2:
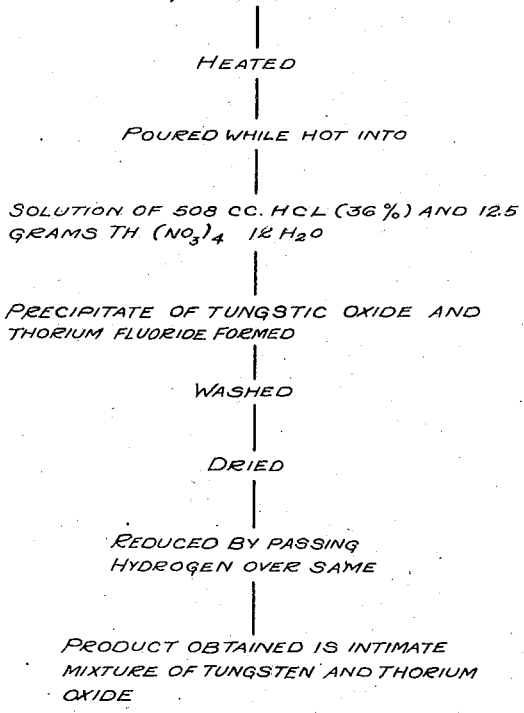

June 17, 1930.　　　　J. H. RAMAGE　　　　1,764,644
THORIATED TUNGSTEN FILAMENT
Filed July 27, 1926　　　2 Sheets-Sheet 1

PREPARATION OF TUNGSTEN THORIUM OXIDE
FILAMENT CONTAINING CARBON

SOLUTION OF 750 GRAMS OF TUNGSTIC OXIDE, 706 CC. OF AMMONIA (29%)
1765 CC. OF WATER, AND 5.15 GRAMS OF AMMONIA OXALATE.
|
HEATED
|
POURED HOT INTO
|
SOLUTION OF 508 CC. OF HYDROCHLORIC ACID (36%) AND 12.5 GRAMS
OF THORIUM NITRATE
|
PRECIPITATE OF TUNGSTIC OXIDE AND TH $(C_2O_4)_2$
|
WASHED
|
DRIED
|
REDUCED BY PASSING DRY HYDROGEN
OVER PRECIPITATE
|
PRODUCT OBTAINED IS MIXTURE OF TUNGSTEN,
THORIUM OXIDE AND TUNGSTEN CARBIDE.
|
POWDER AGGLOMERATED
|
SINTERED
|
HEAT TREATED
|
FABRICATED INTO DESIRED FORM BY MECHANICALLY
WORKING, SUCH AS SWAGING, DRAWING, ETC.
|
ACTIVATION BY HEATING, TO REDUCE
THORIUM OXIDE TO THORIUM

FIG. 1.

INVENTOR
JOHN H. RAMAGE
BY
ATTORNEY

Patented June 17, 1930

1,764,644

UNITED STATES PATENT OFFICE

JOHN HUMPHREYS RAMAGE, OF BLOOMFIELD, NEW JERSEY, ASSIGNOR TO WESTINGHOUSE LAMP COMPANY, A CORPORATION OF PENNSYLVANIA

THORIATED TUNGSTEN FILAMENT

Application filed July 27, 1926. Serial No. 125,333.

This invention relates to electric incandescent lamps and more particularly to a method of improving the offset-resisting properties of a filament such as a tungsten filament.

In vacuum type lamps it has been customary to employ as the incandescent body a tungsten filament containing an offset-resisting material such as thorium oxide. It has been found that filaments of this character are at times subject to an early burn-out, that is, lamps embodying thoriated tungsten filaments sometimes fail before the lamp has burned a useful period of time. In investigating this matter I have found that the cause for early burn-outs may be primarily occasioned by the lack of uniform distribution of the thorium-oxide throughout the filament and the fineness of division of the thoria particles.

I have discovered that a thoriated tungsten filament may have a longer life when the added or auxiliary thoriated material is in a fine state of subdivision and is uniformly distributed throughout the filament.

Therefore, it is an object of my invention to provide a method whereby the thoria content of a thoriated tungsten filament is in a fine state of subdivision and uniformly distributed throughout the filament.

A further object of my invention is to provide a method of increasing the burn-out life of a thoriated tungsten filament.

A still further object of my invention is to improve the qualities of a thoriated tungsten filament so as to increase its burn-out life.

Other objects of the invention will become apparent as the following detailed description is read.

Briefly stated, the invention consists in thoroughly disseminating throughout a tungsten filament, thoria particles of extremely small size. This may be accomplished, in one or more ways, such as by forming solutions containing the constituent ingredients and simultaneously precipitating the materials therefrom. It is to be appreciated that in practicing my invention such factors as the dilution of the thoriating material, temperature of the solution during precipitation, speed of precipitating, temperatures of firing the doped metal and treating the same are to be recognized as being effective in obtaining satisfactory results. However, such factors are variable and depend upon the amounts of the ingredients employed, size of the resultant product, etc., therefore no definite instructions can be given for each case as the foregoing factors must be altered to suit specific conditions.

Fig. 1 is a diagram or flow sheet indicating the various steps employed in the preparation of the intimate mixture of tungsten and thorium oxide; and, Fig. 2 is a diagram or flow sheet of the various steps employed in the preparation of an intimate mixture of tungsten, thorium oxide and carbon.

One embodiment of my invention consists in simultaneously precipitating tungstic oxide ($WO_3$) and the doping reagent, which latter for the sake of convenience, will be considered as thorium oxide. Since tungstic oxide is acid and thorium oxide basic, this cannot be done directly by precipitation together from a mixed solution of solvents. However, I have found that the desired result may be accomplished by the following procedure.

I first form a solution consisting of 750 grams of tungstic oxide, 706 cc. of ammonia (28%) 1765 cc. of water and 2.7 grams of ammonium fluoride (dehydrated). I next form a solution of 508 cc. HCl (36%) and 12.5 grams of $Th(NO_3)_4 \cdot 12 H_2O$. The first solution is heated and while hot is poured into the second solution. This results in a precipitate consisting of tungstic oxide and thorium fluoride. The precipitate is removed, washed and dried and then reduced by passing hydrogen thereover. The hydrogen reduction is effected in a manner similar to that at present practiced in the reduction of tungstic oxide to metal. The resultant product thus obtained will be found to consist of an intimate mixture of tungsten and thorium oxide, the latter being in a fine state of subdivision and uniformly distributed through the tungsten.

The reaction is as follows:

$$ThF_4 + WO_3 + dry\ H_2 = W + ThO_2 + WF_6 + H_2O.$$

Although a small amount of tungsten is lost through the removal of the fluorine, the amount thereof can be readily calculated and adequate provision made therefor in preparing the solutions.

In preparing filaments for radio tubes it is desirable to introduce carbon into the thoria-doped tungsten. Wire of this nature although especially suitable for producing an activated tungsten filament may be employed for vacuum lamps. In preparing a filament of this character the following procedure may be followed.

A solution is prepared consisting of 750 grams of tungstic oxide ($WO_3$), 706 cc. of ammonia ($NH_4OH$) (29%), 1765 cc. of water and 5.15 grams of ammonia oxalate (($NH_4)_2C_2O_4.H_2O$). A second solution is also prepared consisting of 508 cc. of hydrochloric acid (HCl) (36%) and 12.5 grams of thorium nitrate ($Th(NO_3)_4.H_2O$). The precipitate is obtained hot by pouring the first solution into the second and consists of $WO_3$ and $Th(C_2O_4)_2$. The precipitate is washed and dried and then reduced by dry hydrogen at a low temperature short reducing schedule.

The reaction is as follows:

$$WO_3 + Th(C_2O_4)_2 + H_2 = W + ThO_2 + WC_x + H_2O.$$

The powder thus obtained may be agglomerated, sintered and heat treated to produce a slug or bar of dense coherent metal after which it may be worked down in accordance with standard practice to filamentary sizes. The filament thus obtained may be mounted in a radio tube and subsequently heat treated by well known methods to bring about a reduction of the thorium oxide to thorium to obtain the activation of the filament.

Modifications of the invention may occur to those skilled in the art but such modifications are contemplated by me as come within the scope of the invention as defined by the appended claims.

What is claimed is:

1. The method of preparing thoriated tungsten which comprises simultaneously effecting the precipitation of tungstic acid and an acid insoluble thorium compound, recovering the precipitate and effecting the reduction of the tungsten content of the precipitate to metal in any convenient manner.

2. The method of preparing thoriated tungsten which comprises simultaneously effecting the precipitation of tungstic acid and an acid insoluble thorium compound, recovering the precipitate and thereafter reducing the tungsten content of the precipitate to metal with hydrogen.

3. The method of preparing thoriated tungsten metal powder which comprises separately forming an alkaline solution of a tungsten compound and an acid solution of a thorium compound, adding to said alkaline solution a proportion of a soluble compound capable of reaction with the thorium content of the said acid solution to form acid insoluble compounds of thorium, admixing the two solutions while one of the solutions is heated, rendering the admixed solutions acid to effect the precipitation of the acid insoluble thorium compound and the tungsten content of the solutions, separating the precipitated thorium and tungsten compounds from the solution, and thereafter subjecting the precipitate to the action of a reducing agent.

4. The method of preparing thoriated tungsten metal powder which comprises forming an alkaline solution of tungsten oxide, forming an acid solution of a thorium compound, adding to the alkaline solution a proportion of a compound reactive with the thorium content of the acid solution to form an acid insoluble compound, admixing the two solutions, acidifying the admixed solution to effect a precipitation of the insoluble thorium and tungsten compounds, recovering the precipitate and thereafter effecting the reduction of the tungsten content of the precipitate to metal in any suitable manner.

5. The method of preparing thoriated tungsten metal powder which comprises forming an ammoniacal solution of tungsten trioxide, forming an acid solution of thorium nitrate, adding to the tungsten solution a proportion of ammonium fluoride sufficient in amount to react with the entire thorium content of the thorium nitrate solution, admixing the two solutions, acidifying the admixture to effect the separation of tungstic acid, recovering the precipitate, and effecting a reduction of the tungsten content to metal in any convenient manner.

6. The method of preparing thoriated tungsten metal powder which comprises forming an ammoniacal solution of tungsten trioxide, adding thereto a proportion of ammonium fluoride, acidifying the solution with an acid solution containing a proportion of an acid soluble thorium compound substantially equivalent in amount to the ammonium fluoride content of the tungsten solution, recovering the precipitated tungstic acid and thorium fluoride admixture, and effecting the reduction of the tungsten component of the admixture to metal by heating the admixture to elevated temperatures in hydrogen.

In testimony whereof, I have hereunto subscribed my name this 24th day of July, 1926.

JOHN HUMPHREYS RAMAGE.